(12) United States Patent
Albal et al.

(10) Patent No.: US 7,558,587 B2
(45) Date of Patent: Jul. 7, 2009

(54) SYSTEM AND METHOD FOR DYNAMICALLY SELECTING WIRELESS INFORMATION COMMUNICATION MODES FOR A WIRELESS COMMUNICATION DEVICE

(75) Inventors: Nandakishore A. Albal, Scottsdale, AZ (US); Peter J. Armbruster, Chandler, AZ (US); Jay P. Jayapalan, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 287 days.

(21) Appl. No.: 11/301,301

(22) Filed: Dec. 12, 2005

(65) Prior Publication Data
US 2007/0133484 A1    Jun. 14, 2007

(51) Int. Cl.
*H04B 7/00* (2006.01)
(52) U.S. Cl. ............... 455/509; 455/518; 455/452.1; 455/515; 455/464; 455/414.1; 455/522; 370/345; 370/347; 370/326; 370/336
(58) Field of Classification Search .............. 455/518, 455/452.1, 414.1, 522, 464, 515
See application file for complete search history.

(56) References Cited

U.S. PATENT DOCUMENTS

| | | | |
|---|---|---|---|
| 5,727,002 A | | 3/1998 | Miller et al. |
| 5,920,818 A * | | 7/1999 | Frodigh et al. ............. 455/443 |
| 5,946,316 A * | | 8/1999 | Chen et al. ................. 370/408 |
| 5,982,762 A * | | 11/1999 | Anzai et al. ................ 370/338 |
| 6,151,696 A | | 11/2000 | Miller et al. |
| 6,298,058 B1 * | | 10/2001 | Maher et al. ............... 370/390 |
| 6,625,442 B1 * | | 9/2003 | Kojima ..................... 455/414.1 |
| 7,085,575 B2 * | | 8/2006 | Fabien et al. .............. 455/452.1 |
| 7,162,241 B2 * | | 1/2007 | Kim et al. ................. 455/435.2 |
| 7,424,007 B2 * | | 9/2008 | Meier et al. ................. 370/352 |
| 2001/0037472 A1 * | | 11/2001 | Li ................................. 714/4 |
| 2003/0134622 A1 * | | 7/2003 | Hsu et al. ..................... 455/414 |
| 2003/0134653 A1 * | | 7/2003 | Sarkkinen et al. ........... 455/517 |
| 2003/0157966 A1 * | | 8/2003 | Sato et al. .................... 455/561 |
| 2003/0232594 A1 * | | 12/2003 | Shaheen .................... 455/3.06 |
| 2004/0157640 A1 * | | 8/2004 | Pirskanen et al. ........ 455/552.1 |
| 2004/0224698 A1 * | | 11/2004 | Yi et al. ....................... 455/450 |
| 2005/0070256 A1 * | | 3/2005 | Hu ........................... 455/414.1 |
| 2005/0085254 A1 * | | 4/2005 | Chuah et al. ................. 455/522 |
| 2005/0105544 A1 * | | 5/2005 | Pirskanen et al. ............ 370/432 |
| 2005/0129017 A1 * | | 6/2005 | Guingo et al. ............... 370/390 |
| 2005/0198261 A1 * | | 9/2005 | Durvasula et al. ........... 709/224 |

* cited by examiner

*Primary Examiner*—Charles N Appiah
*Assistant Examiner*—Kwasi Karikari

(57) ABSTRACT

A system, method, and wireless device for dynamically selecting a wireless information communication mode for wireless communication of information to at least one wireless device (104). The method includes receiving at least one request for wireless communication of information to at least one wireless device (104). The method further comprises selecting, based at least in part on a total number of wireless devices to receive the wireless communication of information, a mode of wireless communication of information to the at least one wireless device (104). The mode of wireless communication being selected from at least one of a wireless information broadcast communication mode, a wireless information multicast communication mode, and a wireless information unicast communication mode. The at least one wireless device (104) is wireless notified to set its current wireless communication mode to the selected mode of wireless communication to receive the wireless communication of the information.

6 Claims, 6 Drawing Sheets

SYSTEM AND METHOD FOR DYNAMICALLY SELECTING WIRELESS INFORMATION COMMUNICATION MODES FOR A WIRELESS COMMUNICATION DEVICE

CROSS REFERENCE TO RELATED APPLICATION

This application is related to the inventors' application entitled "System and Method For Determining A Forward Channel Rate For Wirelessly Communicating Information To A Wireless Communication Device", Ser. No. 11/301,302, which was filed on the same day as the present application and commonly assigned herewith to Motorola, Inc. This related application is incorporated herein by reference in its entirety.

FIELD OF THE INVENTION

The present invention generally relates to the field of wireless communication devices, and more particularly relates to dynamically managing broadcast/multicast and unicast communication modes for wireless communication devices.

BACKGROUND OF THE INVENTION

Wireless communication devices have evolved greatly over the past few years. A wide variety of content such as stock quotes, news, weather, video/audio, and the like can now be provided to a wireless communication device. To provide such diverse content in an efficient manner, two types of wireless information communication modes can be used. The first wireless information communication mode is unicast. Unicast communication sends a copy of the requested information to each of the requesting devices. Unicast is a point-to-point communication method and is useful when not transmitting to large numbers of receiving devices.

The second wireless information communication mode is broadcast/multicast services or BCMCS. The Third Generation Partnership Project 2 or 3GPP2 standards define BCMCS as a service intended to provide a flexible and efficient mechanism to send common (the same) information to multiple users using the most efficient use of air interface and network resources. Retransmission and acknowledgment in BCMCS are not required, since the type of transmission is "one way" and "one to many". Users (wireless communication devices) can subscribe for BCMCS. For example, a BCMCS subscription is normally associated with the program (e.g. CNN, Disney Channel, Sports Channel). In another embodiment, a BCMCS subscription is also associated with media related services such as pay-per-view. By selecting the program, the user selects the type of content he or she wishes to receive. However the type of information transmitted could be any type of data, e.g. text, multimedia (e.g. voice), real-time, and non-real-time streaming media.

BCMCS programs may be transmitted to all or selected regions of the wireless communications network. These regions constitute the transmission territory. Operationally, the transmission territory for each BCMCS program can be independently defined.

Although unicast and broadcasting/multicasting modes are useful methods for transmitting information, an efficient way to optimize these unicast and broadcast/multicast communication modes in a wireless communications system does not exist. Current standards do not define how broadcast/multicast services should be delivered to wireless communication devices.

Therefore a need exists to overcome the problems with the prior art as discussed above.

SUMMARY OF THE INVENTION

Briefly, in accordance with the present invention, disclosed are a system, method, and a wireless communication device for selecting at least one of a wireless information broadcast communication mode, a wireless information multicast communication mode, and a wireless information unicast communication mode, for wireless communication of information to at least one wireless communication device. The method includes receiving at least one request for wireless communication of information to at least one wireless communication device. The method further comprises selecting, based at least in part on a total number of wireless communication devices to receive the wireless communication of information, a mode of wireless communication of information to the at least one wireless communication device. The mode of wireless communication being selected from at least one of a wireless information broadcast communication mode, a wireless information multicast communication mode, and a wireless information unicast communication mode. The method also comprises wirelessly notifying the at least one wireless communication device to set its current wireless communication mode to the selected mode of wireless communication to receive the wireless communication of the information.

In another embodiment of the present invention a wireless communication system for selecting at least one of a wireless information broadcast communication mode, a wireless information multicast communication mode, and a wireless information unicast communication mode, for wireless communication of information to at least one wireless communication device. The system comprises a receiver for receiving at least one request for wireless communication of information to at least one wireless communication device. The system further comprises a wireless communication mode selector. The wireless communication mode selector is communicatively coupled with the receiver, for dynamically selecting a mode of wireless communication of information to the at least one wireless communication device. The mode of wireless communication is selected from at least one of a wireless information broadcast communication mode, a wireless information multicast communication mode, and a wireless information unicast communication mode. A notifier for wirelessly notifying the at least one wireless communication device to set its current wireless communication mode to the selected mode of wireless communication to receive the wireless communication of the information is also included. The notifier is communicatively coupled with the wireless communication mode selector.

In yet another embodiment of the present invention a wireless communication device is disclosed. The wireless communication device comprises a controller that is communicatively coupled to the wireless transceiver. A wireless communication mode selector for dynamically selecting a mode of wireless communication of information to the wireless communication device is also included. The wireless communication mode selector is communicatively coupled with the controller. The mode of wireless communication is selected from at least one of the following three modes: a wireless information broadcast communication mode, a wireless information multicast communication mode, and a wireless information unicast communication mode. The wireless communication mode selector being responsive to reception of a wirelessly received notification of a selection of a mode of wireless communication for the wireless communication device to set its current wireless communication mode to the selected mode of wireless communication to receive the wireless communication of the information.

An advantage of the foregoing embodiments of the present invention is that wireless information communication modes such as unicast and broadcast/multicast are dynamically selected to optimize the wireless transmission of information to a wireless communication device.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The present invention, according to an embodiment, overcomes problems with the prior art optimizing the wireless communication of information to wireless communication devices. The present invention dynamically selects a wireless information communication mode based at least in part on the total number of wireless communication devices to receive particular information.

The term wireless communication device is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, residential gateway, and the like.

Exemplary Wireless Communications System

Figure 1:
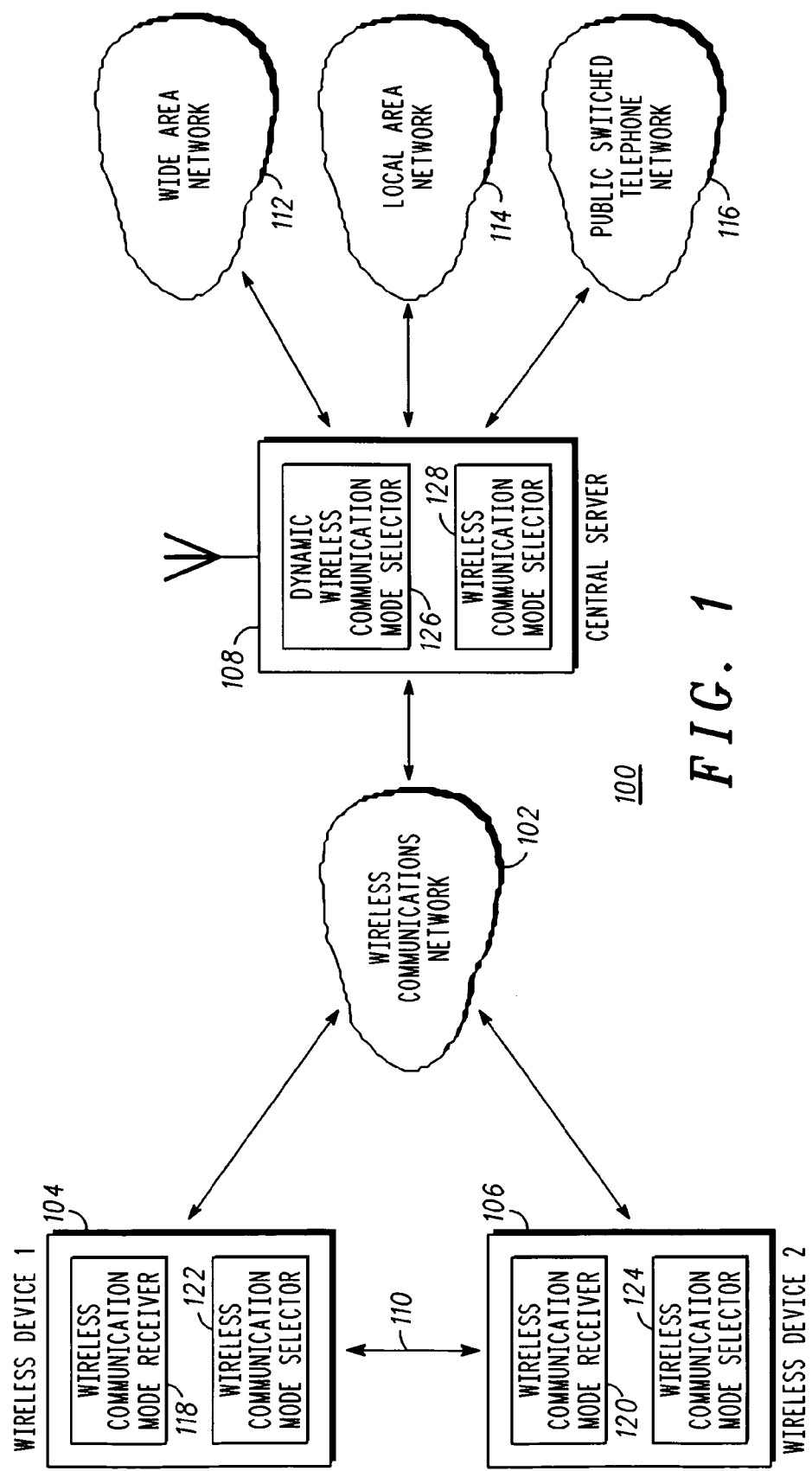
FIG. 1 is block diagram illustrating an exemplary wireless communications system according to an embodiment of the present invention.

According to an embodiment of the present invention, as shown in FIG. 1, an exemplary wireless communications system 100 is illustrated. FIG. 1 shows a wireless communications network 102, that connects wireless communication devices such as wireless communication device1 104 and wireless communication device2 106 with a central server 108. The wireless communications network 102 comprises a mobile phone network, a mobile text messaging device network, a pager network, or the like. Further, the communications standard of the wireless communications network 102 of FIG. 1 comprises Code Division Multiple Access (CDMA), Time Division Multiple Access (TDMA), Global System for Mobile Communications (GSM), General Packet Radio Service (GPRS), Frequency Division Multiple Access (FDMA), Orthogonal Frequency Division Multiplexing (OFDM), or the like.

Additionally, the wireless communications network 102 also comprises text messaging standards, for example, Short Message Service (SMS), Enhanced Messaging Service (EMS), Multimedia Messaging Service (MMS), or the like. The wireless communications network 102 also allows for push-to-talk over cellular communications between capable wireless communication devices.

The wireless network 102 supports any number of wireless communication devices 104, 106. The support of the wireless network 102 includes support for mobile telephones, smart phones, text messaging devices, handheld computers, pagers, beepers, or the like. A smart phone is a combination of 1) a pocket PC, handheld PC, palm top PC, or Personal Digital Assistant (PDA), and 2) a mobile telephone. More generally, a smartphone can be a mobile telephone that has additional application processing capabilities. In one embodiment, the wireless communications network 102 includes one or more base stations (not shown).

Additionally, in one embodiment, the wireless communication devices 104, 106 also include an optional local wireless link 110 that allows the wireless communication devices 104, 106 to directly communicate with each other or with other without using the wireless network 102. The optional local wireless link 110, for example, is provided by Bluetooth, Infrared Data Access (IrDA) technologies or the like.

The wireless communication devices 104, 106 include a wireless communication mode receiver 118, 120 and a wireless communication mode selector 122, 124. The wireless communication mode receiver 118, 120 receives wireless communication mode information from the central server 108 and/or a the wireless communication network 102. For example, the central server 108 notifies the wireless communication devices 104, 106 to use a specific wireless mode such as an information broadcast mode, a multicast mode, and a unicast mode. The wireless communication mode selector 122, 124 dynamically selects the appropriate wireless communication mode according to the information received from the central server 108 or the wireless communication network 102. In one embodiment, the wireless communication devices 104,106 are capable of receiving broadcast/multicast services.

The central server 108 maintains and processes information for all wireless devices such as the wireless communication devices 104, 106 communicating on the wireless network 102. Additionally, the central server 108, in this example, communicatively couples the wireless communications devices 104, 106 to a wide area network 112, a local area network 114, and a public switched telephone network 116 through the wireless communications network 102. Each of these networks 112, 114, 116 has the capability of sending data, for example, a multimedia text message to the wireless devices 104, 106.

The central server also includes a dynamic wireless communication mode selector 126 for dynamically selecting a wireless communication mode for wirelessly communicating with the wireless devices 104, 106. For example, based on the amount of requests for particular information, the dynamic wireless communication mode selector 126 dynamically selects a wireless communication mode such as an information broadcasting mode, a multicast mode, or a unicast mode. A wireless communication mode notifier 128 is also included in the central server 108 for notifying the wireless devices 104, 106 to use a specific wireless communication mode. The dynamic wireless communication mode selector 126 and the wireless communication mode notifier 128 will be discussed in greater detail below. In an alternative embodiment, the dynamic wireless communication mode selector 126 and/or wireless communication mode notifier 128 resides outside of the central server 108. For example, the wireless dynamic wireless communication mode selector 126 and/or wireless communication mode notifier 128 can reside in the wireless communication network 102.

Exemplary Wireless Communication Device

Figure 2:
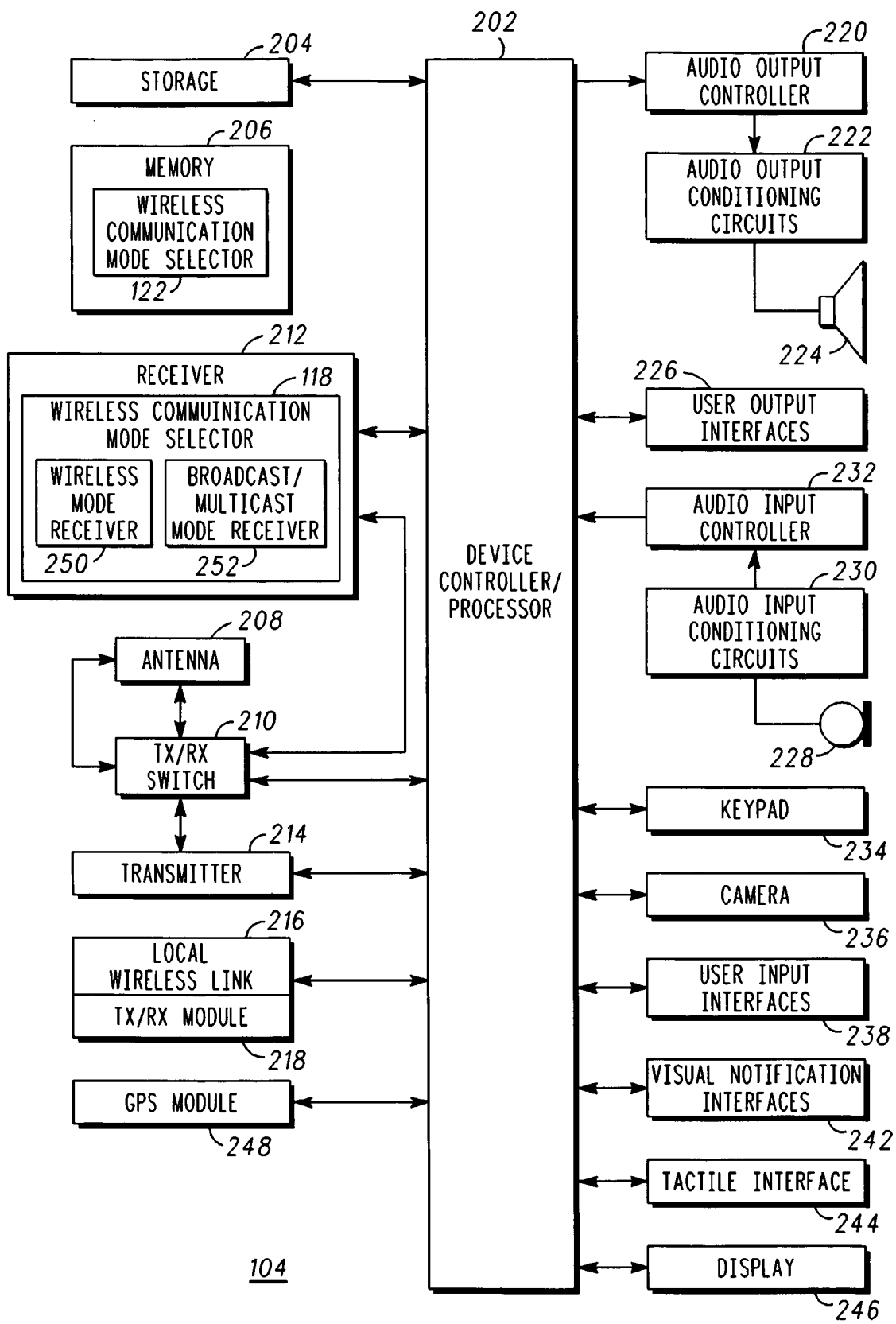
FIG. 2 is a block diagram illustrating an exemplary wireless communication device according to an embodiment of the present invention.

FIG. 2 is a block diagram illustrating a more detailed view of the wireless communication device1 104. The wireless communication device 104 operates under the control of a device controller/processor 202, that controls the sending and receiving of wireless communication signals. In receive mode, the device controller 202 electrically couples an antenna 208 through a transmit/receive switch 210 to a receiver 212. The receiver 212 decodes the received signals and provides those decoded signals to the device controller 202. The receiver 212 also includes the wireless communication mode receiver 118. The wireless communication mode receiver 118, in one embodiment, further includes a unicast communication mode receiver 250 and an information broadcasting/multicast mode receiver 252. The unicast communication mode receiver 250 receives a notification from the central server 108 or the wireless communication network 102 to use a unicast communication for wireless receiving requested information. The information broadcasting/multicast mode receiver 252 receives a notification from the central server 108 or the wireless communication network 102 to use an information broadcasting communication mode or multicast mode for wireless receiving requested information.

In transmit mode, the device controller 202 electrically couples the antenna 208, through the transmit/receive switch 210, to a transmitter 214. The device controller 202 operates the transmitter and receiver according to instructions stored in the memory 206. These instructions include, for example, a neighbor cell measurement-scheduling algorithm. The memory 206 also includes the wireless communication mode selector 122. Although shown residing in memory, the wireless communication mode selector 112, in one embodiment, is implemented as a hardware component.

FIG. 2 also includes non-volatile storage memory 204 for storing, for example, an application waiting to be executed (not shown) on the wireless communication device 104. The wireless communication device 104, in this example, also includes an optional local wireless link 216 that allows the wireless communication device 104 to directly communicate with another wireless device without using a wireless network (not shown). The optional local wireless link 216, for example, is provided by Bluetooth, Infrared Data Access (IrDA) technologies, or the like. The optional local wireless link 216 also includes a local wireless link transmit/receive module 218 that allows the wireless device 104 to directly communicate with another wireless communication device.

The wireless communication device1 104 of FIG. 2 further includes an audio output controller 220 that receives decoded audio output signals from the receiver 212 or the local wireless link transmit/receive module 218. The audio controller 220 sends the received decoded audio signals to the audio output conditioning circuits 222 that perform various conditioning functions. For example, the audio output conditioning circuits 222 may reduce noise or amplify the signal. A speaker 224 receives the conditioned audio signals and allows audio output for listening by a user. The audio output controller 220, audio output conditioning circuits 222, and the speaker 224 also allow for an audible alert to be generated notifying the user of a missed call, received messages, or the like. The wireless communication device 104 further includes additional user output interfaces 226, for example, a head phone jack (not shown) or a hands-free speaker (not shown).

The wireless communication device1 104 also includes a microphone 228 for allowing a user to input audio signals into the wireless communication device1 104. Sound waves are received by the microphone 228 and are converted into an electrical audio signal. Audio input conditioning circuits 230 receive the audio signal and perform various conditioning functions on the audio signal, for example, noise reduction. An audio input controller 232 receives the conditioned audio signal and sends a representation of the audio signal to the device controller 202.

The wireless communication device1 104 also comprises a keyboard 234 for allowing a user to enter information into the wireless communication device 104. The wireless communication device1 104 further comprises a camera 236 for allowing a user to capture still images or video images into memory 204. Furthermore, the wireless communication device1 104 includes additional user input interfaces 238, for example, touch screen technology (not shown), a joystick (not shown), or a scroll wheel (not shown). In one embodiment, a peripheral interface 240 is included for allowing the connection of a data cable to the wireless communication device1 104. In one embodiment of the present invention, the connection of a data cable allows the wireless communication device1 104 to be connected to a computer or a printer.

A visual notification (or indication) interface 242 is also included on the wireless communication device1 104 for rendering a visual notification (or visual indication), for example, a sequence of colored lights on the display 246 or flashing one ore more LEDs (not shown), to the user of the wireless communication device1 104. For example, a received multimedia message may include a sequence of colored lights to be displayed to the user as part of the message. Alternatively, the visual notification interface 242 can be used as an alert by displaying a sequence of colored lights or a single flashing light on the display 246 or LEDs (not shown) when the wireless communication device1 104 receives a message, or the user missed a call.

The wireless communication device1 104 also includes a tactile interface 244 for delivering a vibrating media component, tactile alert, or the like. For example, a multimedia message received by the wireless communication device 104, may include a video media component that provides a vibration during playback of the multimedia message. The tactile interface 244, in one embodiment, is used during a silent mode of the wireless communication device 104 to alert the user of an incoming call or message, missed call, or the like. The tactile interface 244 allows this vibration to occur, for example, through a vibrating motor or the like.

The wireless communication device1 104 also includes a display 246 for displaying information to the user of the wireless communication device1 104 and an optional Global Positioning System (GPS) module 248. The optional GPS module 248 determines the location and/or velocity information of the wireless communication device1 104. This module 248 uses the GPS satellite system to determine the location and/or velocity of the wireless communication device1 104. Alternative to the GPS module 248, the wireless communication device1 104 may include alternative modules for determining the location and/or velocity of wireless communication device 104, for example, using cell tower triangulation and assisted GPS.

Exemplary Information Processing System

Figure 3:
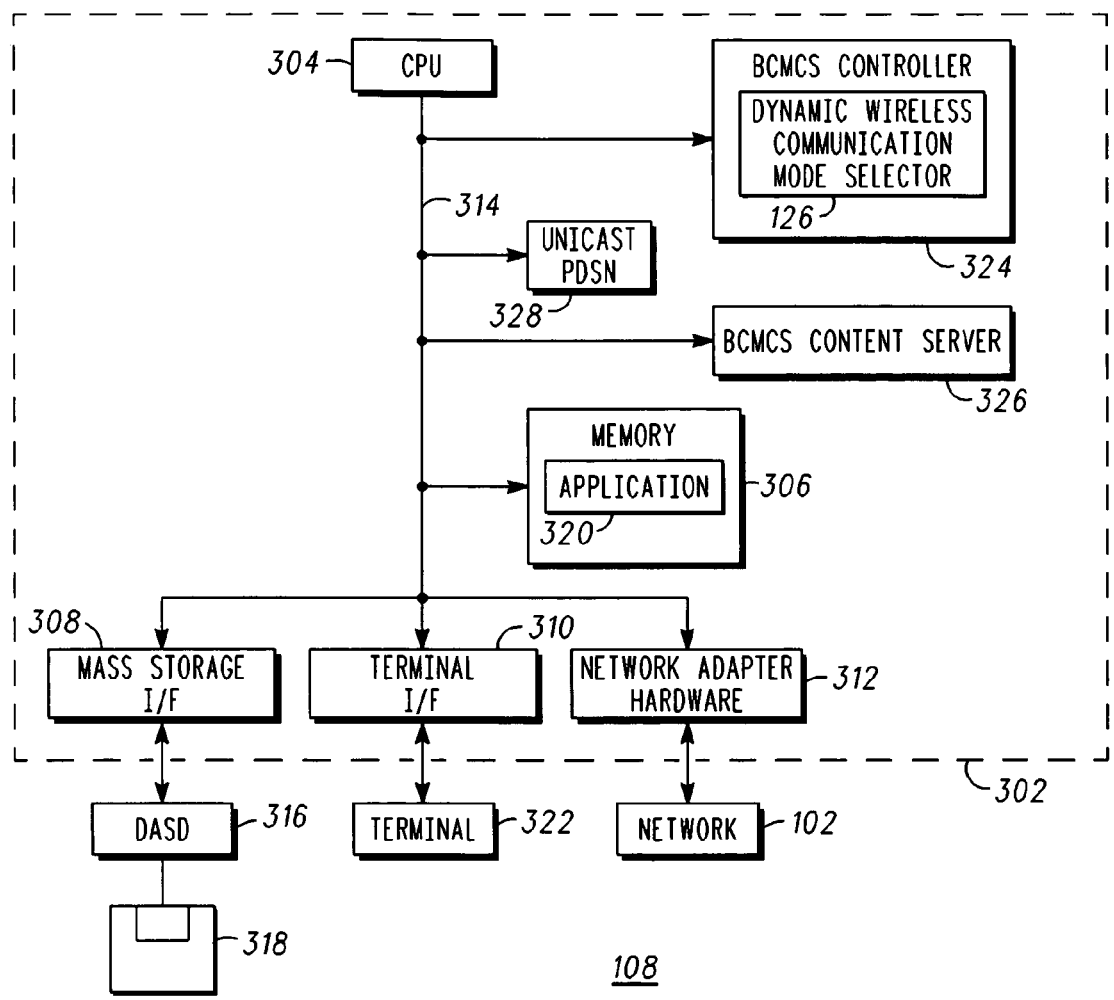
FIG. 3 is a block diagram illustrating an exemplary information processing system according to an embodiment of the present invention.

FIG. 3 is a block diagram illustrating a more detailed view of the central server1 108 according to an embodiment of the present invention The central server 108 is based upon a suitably configured processing system adapted to implement the exemplary embodiment of the present invention. Any suitably configured processing system is similarly able to be used as central server 108 by embodiments of the present invention, for example, a personal computer, workstation, or the like. The central server 108 includes a computer 302. The computer 302 has a processor 304 that is connected to a main memory 306, mass storage interface 308, terminal interface 310, and network adapter hardware 312. A system bus 314 interconnects these system components. Mass storage interface 308 is used to connect mass storage devices, such as data storage device 316, to the central server 108. One specific type of data storage device is a computer readable medium such as a floppy disk drive, which may be used to store data to and read data from a floppy diskette 318 or CD/DVD (not shown). Another type of data storage device is a data storage device configured to support NTFS type file system operations.

The central server 108 includes a broadcast/multicast service ("BCMCS") controller 324. Broadcast services are services involving the simultaneous transmission of the same date to multiple destinations in near real-time. Generally, the content is broadcast to wide local, regional, or national areas, reaching a large number of widely distributed users. The service may be free or may require subscription. Television and AM/FM radio are a few examples of broadcast services.

Multicast Services are services involving the transmission of data destined for more than one destination as compared to a unicast service where a copy of the data is sent to each individual destination. This is a limited form of broadcast where the content is distributed to a much more limited number of users. One example of a multicast service is location based advertisements. Another example of multicast is when an information channel is only available to a select group of users who have subscribed to the channel.

The BCMCS controller 324 is a core network function that is responsible for managing and providing BCMCS session information throughout the wireless communication system 100. The BCMCS controller 324, in one embodiment, includes the dynamic wireless communication mode selector 126. Although the BCMCS controller 324 is shown as residing in the central server 108, in one embodiment, the BCMCS controller 324 resides on a separate information processing system. The BCMCS controller 324 will be discussed in greater detail below.

The central server 108 also includes the BCMCS content server 326 for making BCMCS content available within an IP multicast stream to the wireless communication devices 104, 106. The BCMCS content server 326, in one embodiment, includes control logic (not shown) to interface with the BCMCS controller 324 and BCMCS content providers 402, 404, 406 (FIG. 4) and buffers for payload data payload. In another embodiment, the BCMCS content server 326 also includes media converters/format converters for converting media/format to what is acceptable by the wireless devices 104, 106. Although the BCMCS content server 326 is shown as residing in the central server 108, in one embodiment, the BCMCS content server 326 resides on a separate information processing system. The BCMCS content server 326 will be discussed in greater detail below.

The central server 108 also includes a unicast packet data serving node ("PDSN") 328 that acts as the first-hop router for IP unicast traffic to and from the wireless device 104, 106. The unicast PDSN 328, in another embodiment, resides on an information processing system. The unicast PDSN 328 will be discussed in greater detail below. FIG. 3 shows the BCMCS controller 324, the BCMCS content server 326, and the unicast PDSN 328 sharing the same CPU 304 and memory 328. However, in another embodiment, the BCMCS controller 324, the BCMCS content server 326, and the unicast PDSN 328 each are communicatively coupled to one or more separate CPUs and memory.

The memory 306 also includes an application 320 that is running or waiting to be executed. Although illustrated as concurrently resident in the main memory 306, it is clear that respective components of the main memory 306 are not required to be completely resident in the main memory 306 at all times or even at the same time. In one embodiment, the central server 108 utilizes conventional virtual addressing mechanisms to allow programs to behave as if they have access to a large, single storage entity, referred to herein as a computer system memory, instead of access to multiple, smaller storage entities such as the main memory 306 and data storage device 316. Note that the term "computer system memory" is used herein to generically refer to the entire virtual memory of the central server 108.

Although only one CPU 304 is illustrated for computer 302, computer systems with multiple CPUs can be used equally effectively. Embodiments of the present invention further incorporate interfaces that each includes separate, fully programmed microprocessors that are used to off-load processing from the CPU 304. Terminal interface 310 is used to directly connect one or more terminals 322 to computer 302 to provide a user interface to the central server 108. These terminals 322, which are able to be non-intelligent or fully programmable workstations, are used to allow system administrators and users to communicate with the central server 108. The terminal 322 is also able to consist of user interface and peripheral devices that are connected to computer 302 and controlled by terminal interface hardware included in the terminal I/F 310 that includes video adapters and interfaces for keyboards, pointing devices, and the like.

An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the central server 108.

The network adapter hardware 312 is used to provide an interface to the network 102. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 318, CD ROM, or other form of recordable media, or via any type of electronic transmission mechanism.

Exemplary Wireless Communication System Flow Diagram

Figure 4:
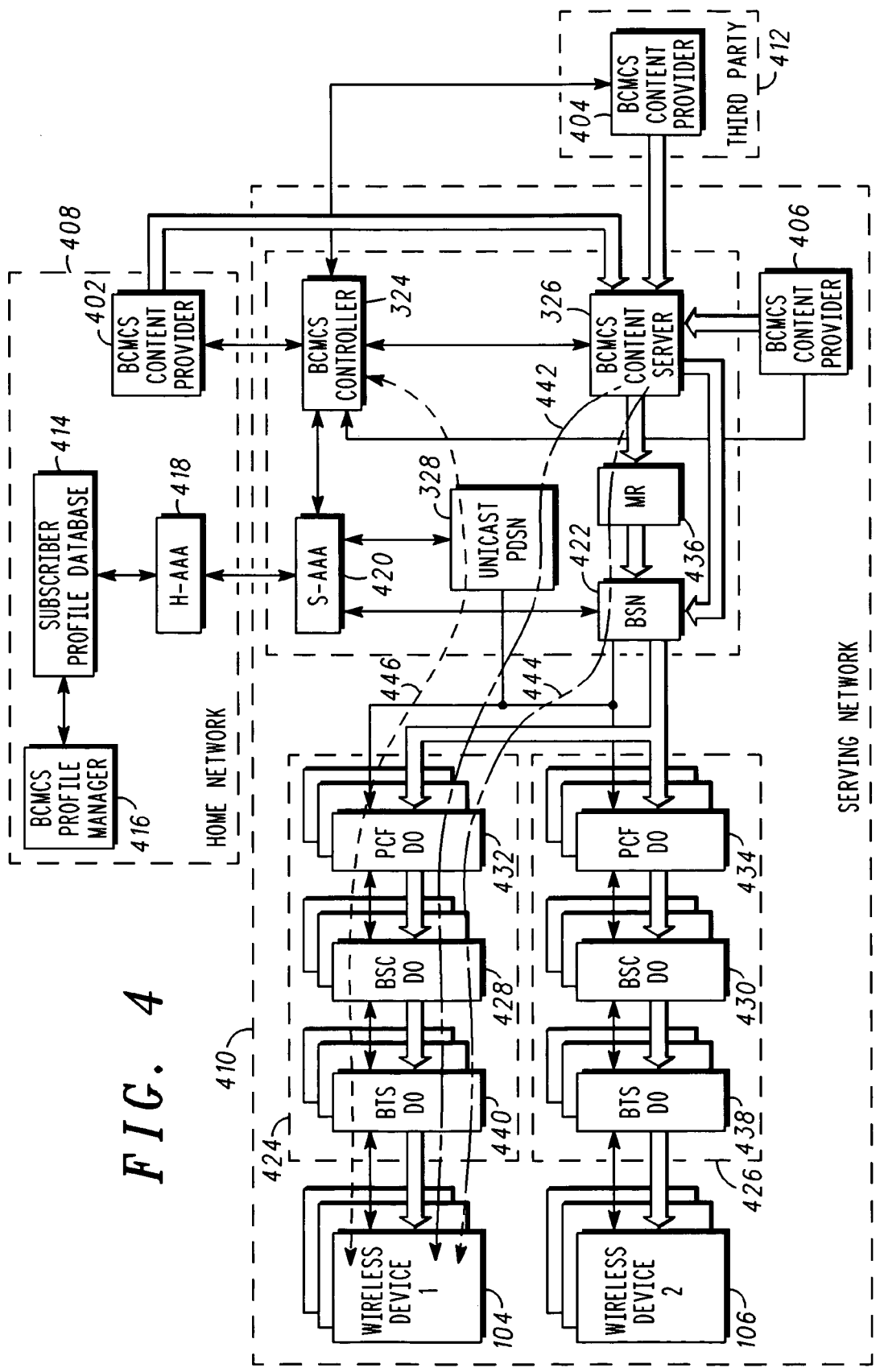
FIG. 4 is system flow diagram illustrating the dynamic managing of wireless information communications modes according to an embodiment of the present invention.

FIG. 4 is a block diagram illustrating an exemplary system communication flow for dynamically switching between wireless communication modes according to an embodiment of the present invention. The system communication flow of FIG. 4 is directed towards a 3GPP2 network and is only one example of how the present invention can be implemented. The present invention is not limited to a 3GPP2 network as the present invention is applicable to other wireless networks as well.

FIG. 4 shows a BCMCS content provider 402, 404, 406 which creates or comprises the content that is to be provided to the wireless communication devices 104, 106. For example, the BCMCS content provider 402, 404, 406 can reside in the home network 408 or serving network 410 of the wireless communication devices 104, 106. The BCMCS content provider can also reside at a third party location 412. A subscriber profile database 414 is also included in the home network 408. The subscriber profile database 414 is responsible for storing a BCMCS subscription profile (not shown). The BCMCS subscription profile (not shown) identifies the BCMCS sessions that a wireless communication device 104, 106 can receive.

The home network 408, in one embodiment also includes a BCMCS subscriber profile manager 416, subscriber profile database 414, home-AAA 418 and BCMCS Content Provider 402. The BCMCS subscriber profile manager 416, for example, is an application that updates the BCMCS subscription profile (not shown) in the subscriber profile database 414 regarding the subscribed to broadcast/multicast programs. A wireless communication device 104, 106 can interface to the BCMCS profile manager 416 directly, or an administrator of the BCMCS profile manager 416 may reserve access to the BCMCS profile manager 416 to customer service agents only. The home and serving network authentication, authorization and accounting ("H-AAA" and "S-AAA") servers 418, 420 are responsible for service authentication, authorizations, and accounting. The H-AAA 418 accesses the subscriber profile database 414 to obtain information from the subscription profile (not shown). In one embodiment, the S-AAA 420 and BCMCS controller 324 query the H-AAA 418 for the subscription profile (not shown).

The serving network 410 includes the networks 424, 426, BCMCS Content provider 406 and central server 108. The BCMCS controller 324 is a core network function that is responsible for managing and providing BCMCS session information. This information is provided to a broadcast serving node 422 ("BSN"), and the radio access network 424, 426 ("RAN) for the establishment of sessions and bearer paths, optionally via the S-AAA 420. In one embodiment, the BCMCS controller 324 is communicatively coupled with the wireless communication devices 104, 106 via a packet data serving node ("PDSN") such as the unicast PDSN 328, to enable the wireless communication devices to obtain program information, register and deregister for service/programs. The BCMCS controller 324 is communicatively coupled with the BCMCS content server 326 to direct the content server on establishment and termination of bearer paths. The BCMCS controller 324 optionally performs authorization using the BCMCS subscriber profile (not shown) residing in the subscriber profile database 414 through the H-AAA 418. In one embodiment, the BCMCS controller 324 distributes broadcast access keys ("BAK") and may optionally generate them as well. The BCMCS controller 324, in one embodiment, also performs discovery operations to assist the wireless communication devices 104, 106 to find desired content such as stock information, weather information, and the like. The BCMCS controller 324, in one embodiment, also authenticates the BCMCS content provider 402, 404, 406, and coordinates the delivery of BCMCS content to the BCMCS content server 326.

The S-AAA 420, in one embodiment, is co-located with the BCMCS controller 324. The BCMCS controller 324 also maintains a wireless communication device count per flow/sector. For example, a count is maintained for the number of wireless communication devices currently receiving the same wireless information. A flow is a stream of information, such as a CNN video broadcast. The count is used by the BCMCS controller 324, for example, to determine when to dynamically switch a wireless communication mode from unicast to broadcast/multicast or from broadcast/multicast to unicast based at least in part on predefined thresholds.

The BCMCS content server 326 formats the BCMCS content to allow content requested by a wireless communication device 104, 106 to be provided within an IP Multicast stream. The BCMCS content server 326 residing in the serving network 410 is not necessarily the creator or source of the content; it is the last application level entity to manipulate (e.g., reformat) the content prior to the content reaching the broadcast serving node 422 ("BSN"). The BCMCS content server 326, in one embodiment, stores and forwards the content from the BCMCS content provider 402, 404, 406 and merges the content from the multiple content providers 402, 404, 406. In one embodiment, if higher layer encryption is enabled, the BCMCS content server 326 can encrypt the stream content. In this case, the BCMCS content server 326 may also generate short term keys and generates BAKs.

The unicast PDSN 328 communicates with the base station controller 428, 430 ("BSC") and the packet control function 432, 434 ("PCF") to add and remove unicast IP flows. The unicast PDSN 328 supports normal point-to-point protocol ("PPP") connections to and from the wireless communication devices 104, 106. The unicast PDSN 328 acts as the first-hop router for IP unicast traffic to and from the wireless communication devices 104, 106. The BSN 422 communicates with the PCF 432, 434 to add and remove multicast and broadcast IP flows. The BSN 422, in one embodiment, uses IP multicast protocols to manage bearer paths. A bearer path, for example, is a virtual connection which is used to transport the information to the wireless device. The term "Bearer" refers to the information (such as CNN) that supporting multicast IP flows between the BSN 422 and the nearest router connecting back to the BCMCS content server 326. The BSN 422, in one embodiment, applies the flow treatment received from the BCMCS controller 324 to the multicast IP flows.

A multicast router 436 ("MR") is also included in the serving network 410. In an alternative embodiment where the BCMCS content server 324 connects directly to the BSN 422 via Generic Routing Encapsulation ("GRE") tunnels, the MR 436 is not included in the serving network 410. The data only base station controller 428, 430 ("BSC-DO") and the data only packet PCF 432, 434 ("PCF-DO") are responsible for signaling, establishing, and tearing down bearer paths between the BSN 422 and the wireless devices 104, 106. The BSC-DO 428, 430 selects the best bearer path to the wireless device 104, 106 based on considerations such as optimization of resources, quality of service ("QoS") requested, and the like. The BSC-DO 428, 430 also establishes BCMCS transmission territories and supports segment based framing. In one embodiment, the S-AAA 420, BCMCS controller 324, BCMCS content server 326, MR 432, BSN 422 and the unicast PDSN 328 reside within the central server 108. In an alternative embodiment one or more of these components resides outside of the central server 108.

The PCF-DO 432, 434 is included in the RAN 424, 426. The PCF-DO 430 connects to multiple PDSNs and BSNs allowing it to receive BCMCS programs for any BSN capable of transmitting a BCMCS program. A base transceiver station (data only) 436, 438 ("BTS-DO") is also included in the RAN 424, 426. The BTS-DO 436, 438 provides the radio interface to the wireless devices 104, 106. BTSs are "homed" on a BSC-DO 428, 430.

FIG. 4 also shows a unicast communication path 442, a broadcast/multicast communication path 444, and a signaling path 440. The unicast communication path 442 travels from the BCMCS content server 326 through the unicast PDSN 328 to the wireless communication device 104 via the RAN 424. The unicast communication path 442 represents a unicast channel on which information is being wirelessly communicated to the wireless device 104 using a unicast communication mode. In one embodiment, a wireless communication unicast communication mode is used, for example, when a threshold has not been reached, e.g. not enough users requesting the information. Unicast communication is also used when broadcast/multicast resources are not available. Multiple unicast channels can be established to transmit information to the wireless communication devices 104, 106.

The broadcast/multicast communication path 444 travels from the BCMCS content server 326 through the optional multicast router 436 and the BSN 422 to the wireless communication device 104. The BSN 422 generates an IP multicast flow for the requested broadcast/multicast information. The BSN 422 for broadcast/multicast flows is equivalent to the unicast PDSN 328 for unicast flows.

The signaling path 446 travels between the wireless device 104 through the RAN 424 and the unicast PDSN 328 to the BCMCS controller 324. The signaling path 446 notifies the BCMCS controller 324 of the broadcast/multicast information request from the wireless device 104. For example, if the wireless device 104 is requesting news information that is categorized as broadcast/multicast information, the BCMCS controller 324 receives the broadcast/multicast request and determines if a broadcast/multicast communication mode can be used. Broadcast is unidirectional toward the wireless devices. One method to get info from the wireless device to the BCMCS controller 324 is via a unicast channel. This unicast channel, optionally can be dropped when the wireless device is receiving a broadcast flow on the broadcast channel. In another embodiment, the signaling path 444 travels from the BCMCS controller 324 to the wireless communication device 104 to signal the wireless communication device 104 to switch wireless communication modes. For example, if the wireless communication device 104 is currently communicating in a unicast mode the BCMCS controller 324 can signal the wireless communication device 104 to switch to a broadcast/multicast mode and vice versa.

Logical Flow Diagram For Unicast and Broadcast/Multicast Communications

Figure 5:
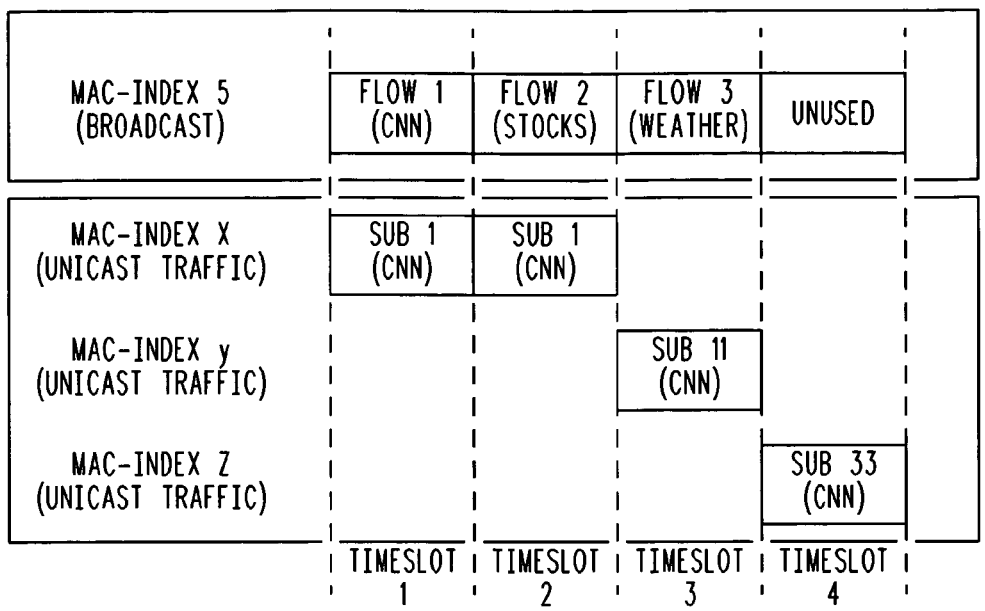
FIG. 5 is a logical flow diagram illustrating logical flows for using an information broadcasting wireless communication mode and a wireless unicast communication mode according to an embodiment of the present invention.

FIG. 5 is a logical flow diagram illustrating how information is wirelessly communicated to a wireless communication device using a broadcasting/multicast wireless communication mode and a wireless unicast communication mode. As described above, broadcast/multicast services deliver the same data to multiple subscribers. Communication systems such as CDMA EV-DO use maximum power to transmit data to wireless devices. The number of timeslots required, and the modulation and coding scheme are varied to deliver data to the requesting wireless communication devices 104, 106. The combination of media access control-index ("MAC-Index") and timeslot(s) defines a communications channel, regardless of how many wireless communication devices share the channel.

Wireless communication devices receiving information using a unicast communication mode are each assigned one MAC-index and one or more timeslots as shown in FIG. 5. Information is transmitted to a specific wireless communication device on one or more timeslots covered by the MAC-index that is assigned to the wireless communication device. Alternatively, a single MAC-index is assigned for the broadcast/multicast channel. Each timeslot may be dedicated to a single flow. Dynamically switching from many unicast channels to a single broadcast/multicast channel saves MAC-indices and reduces the number of timeslots needed, which translates to increased channel capacity. CDMA EV-DO has been used as an exemplary embodiment. However, the concepts of resource optimization are applicable to other wireless systems as well.

Exemplary Processes Of Dynamically Selecting A Wireless Communication Mode

Figure 6:
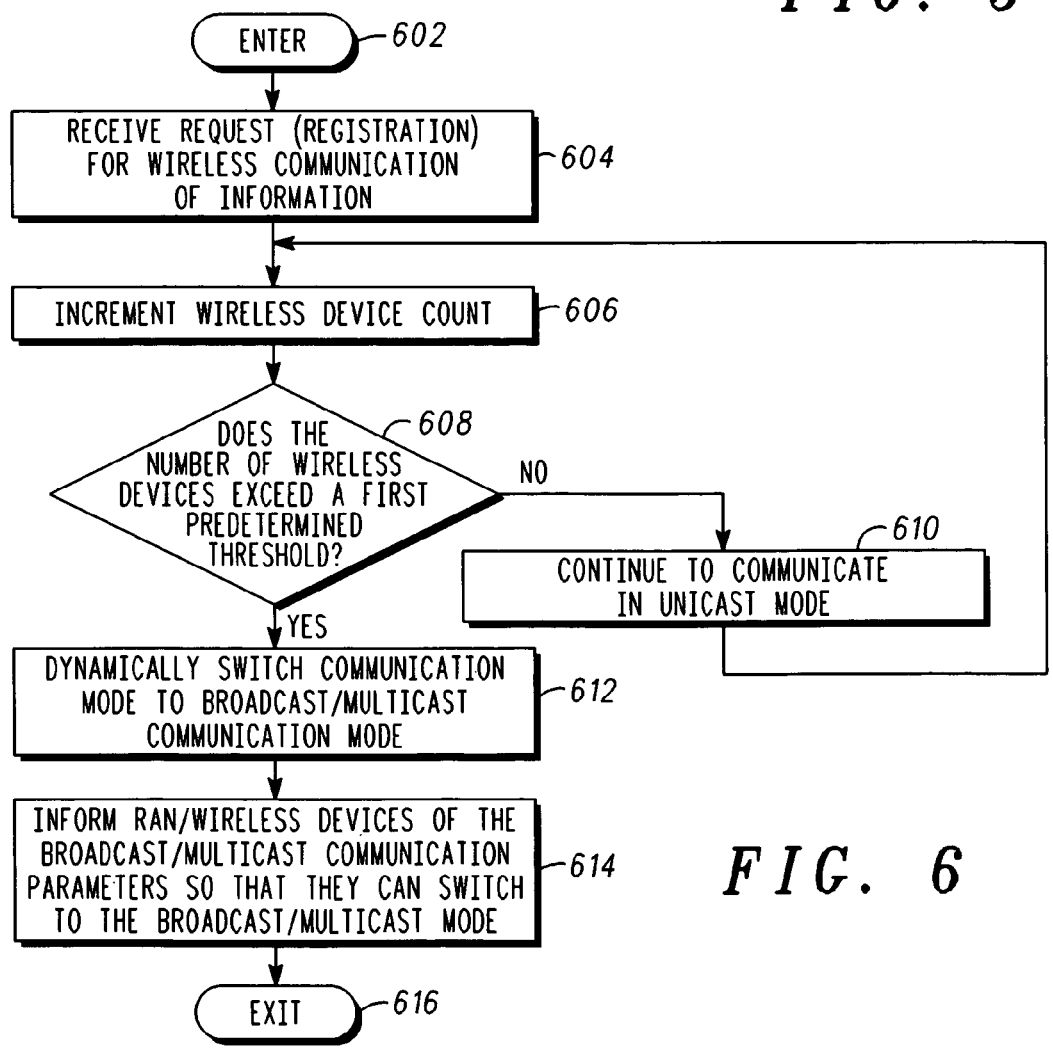
FIG. 6 is an operational flow diagram illustrating an exemplary process of dynamically selecting a wireless information communication mode according to an embodiment of the present invention.
Figure 7:
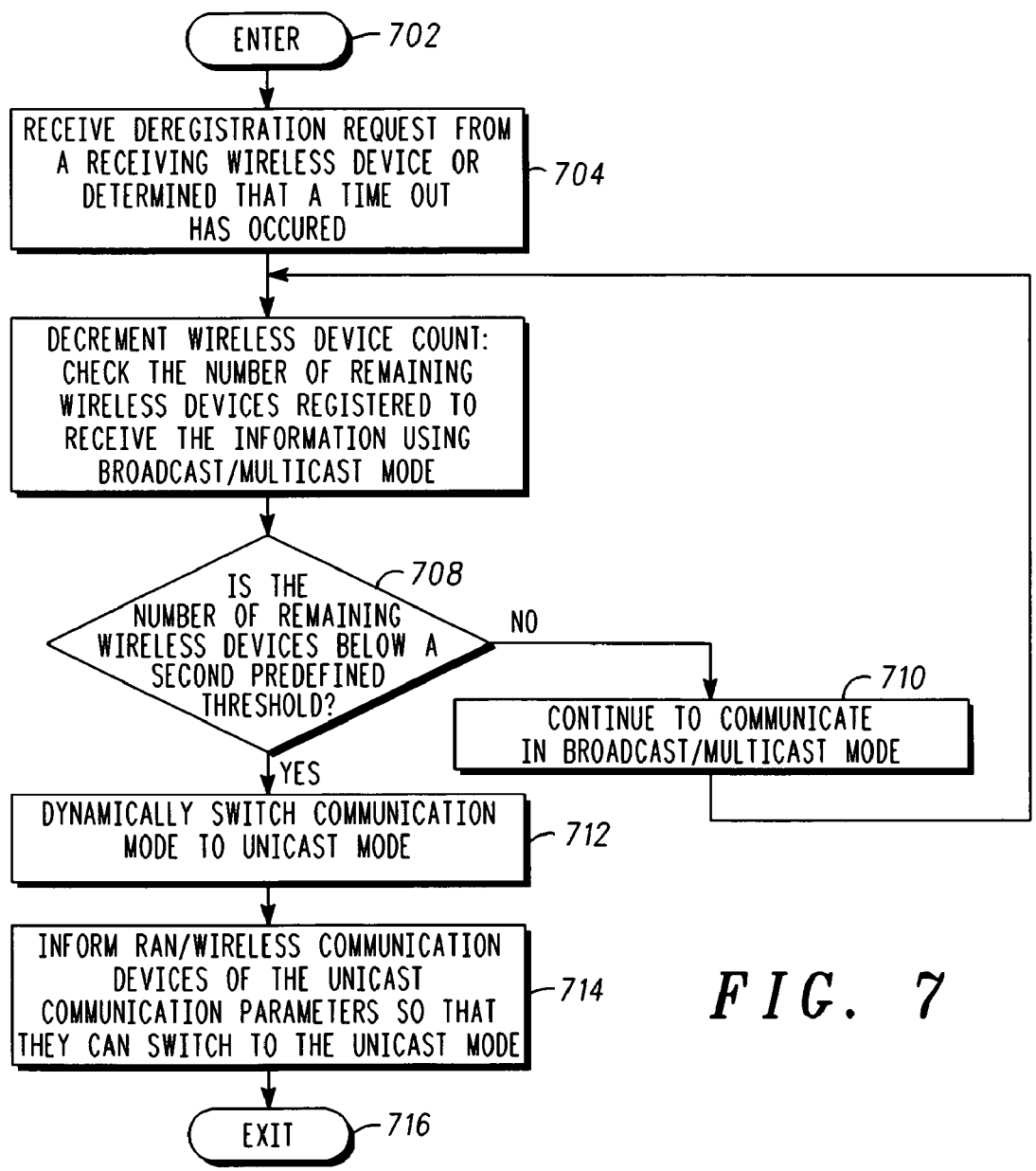
FIG. 7 is an operational flow diagram illustrating another exemplary process of dynamically selecting a wireless information communication mode according to an embodiment of the present invention.

FIG. 6 and FIG. 7 are operational flow diagrams illustrating exemplary processes of dynamically selecting a wireless communication mode. The operational flow diagram of FIG. 6 begins at step 602 and flows directly to step 604. The central server 108, at step 604, receives at least one request (registration) for wireless communication of information. For example, a wireless communication device 104 requests information from the BCMCS controller 324. The BCMCS controller 324, at step 606, increments the wireless device count and determines the number of wireless communication devices that are to receive the wirelessly communicated information. For example, a number of wireless devices can request the same information such as news information or information from the same source within a period of time.

The BCMCS controller 324, in one embodiment, maintains a count of the wireless communication devices requesting a particular type of information. The dynamic wireless communication mode selector 126, at step 608, determines if the number of wireless communication devices to receive the information exceeds a first predefined threshold. If the result of this determination is negative, the central server, at step 610, notifies the wireless communication device requesting service to receive the information using a unicast wireless communication mode. If the result of this determination is positive, the dynamic wireless communication mode selector 126, at step 612, dynamically switches the wireless communication mode to one of a broadcast or multicast communication mode. When a broadcast/multicast communication mode is used to wirelessly communicate information to a wireless communication device a common transmission of the information is sent to wireless communication devices requesting the information.

The wireless communication mode notifier 128, at step 614, informs the wireless communication controller such as the RAN 424, 426, the wireless communication devices communicating in the unicast mode, and any registered devices waiting to receive the information of the broadcast/multicast communication mode parameters. For example, the correct modulation and coding scheme and timeslot information to be used on the broadcast/multicast channel, switchover time, and the like are transmitted to the RAN 424, 426 and the wireless communication devices.

At the switchover time, the RAN 424, 426, the wireless devices 104, 106 and the wireless communications network 102 switch over to the broadcast/multicast channel using the broadcast/multicast mode parameters. For example, if the threshold is set at ten wireless communication devices, the first nine wireless communication devices are initially notified to use a unicast communication mode. When the dynamic wireless communication mode selector 126 determines that the number of wireless communication devices is greater or equal to ten, it signals, at step 614, all the devices including the first nine to use either a broadcast or multicast communication mode. In one embodiment, a higher threshold is set for higher revenue bearing services and a lower threshold is set for non-critical services such as weather information. The control flow then exits at step 616.

Another Exemplary Process for Dynamically Selecting A Wireless Communication Mode FIG. 7 is an operational flow diagram illustrating another exemplary process of dynamically selecting a wireless communication mode. The operational flow diagram of FIG. 7 begins at step 702 and flows directly to step 704. The central server 108, at step 704, receives a deregistration request from a wireless device receiving wireless communication of information. In another embodiment, the central server 108 determines that a time out has occurred. The BCMCS controller 324, at step 706, decrements the wireless device count and checks the number of remaining wireless communication devices that are receiving the wirelessly communicated information. The central server 108, at step 708, determines if the number of wireless communication devices is below a second predefined threshold. If the result of this determination is negative, the use of the broadcast/multicast communication mode, at step 710, is continued. If the result of this determination is positive, the dynamic wireless communication mode selector 126, at step 712, dynamically switches the wireless communication mode to unicast.

In one embodiment, the second predefined threshold is set below the first predefined threshold. In another embodiment, the second predefined threshold is equal to the first predefined threshold, or alternatively, only a single predefined threshold exists. For example, if the second predefined threshold is set at five and the wireless communication devices drop from ten to below five, the wireless communication mode is switched to unicast. The second threshold is set below the first threshold to avoid unnecessarily flipping between broadcast/multicast and unicast modes.

The wireless communication mode notifier 128, at step 714, informs the wireless network controller such as the RAN 424, 426 and the wireless communication devices to be dynamically switched over to the unicast communication of the unicast communication mode parameters. For example, the timeslot information, MAC-Index, switchover time, and the like are transmitted to the RAN 424, 426 and the wireless communication devices. At the switchover time, the RAN 424, 426, the wireless devices 104, 106 and the wireless communications network 102 switch over to the unicast channel using the unicast mode parameters. The control flow then exits at step 716.

Non-Limiting Examples

The foregoing embodiments of the present invention are advantageous because they provide dynamic optimization of the resources available to wireless communication information to wireless communication devices using unicast broadcast/multicast communication modes. Information can be wireless communicated to a wireless communication device in a more manner thereby optimizing network resources.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for selecting at least one of a wireless information broadcast communication mode, a wireless information multicast communication mode, and a wireless information unicast communication mode, for wireless communication of information to at least one wireless communication device, the method comprising:

receiving at least one request for wireless communication of information to at least one wireless communication device;

incrementing a count for a number of wireless communication devices requesting the wireless communication of information upon receipt of the at least one request by the at least one wireless communication device;

decrementing the count when at least one of a deregistration request is received from at least one of the wireless communication devices that has requested the wireless communication of information and at least one of the wireless communication devices that has requested the wireless communication of information has timed out;

selecting, based at least in part on the count of wireless communication devices to receive the wireless communication of information, a mode of wireless communication of information to the at least one wireless communication device, the mode of wireless communication being selected from at least one of:

a wireless information broadcast communication mode, a wireless information multicast communication mode, and a wireless information unicast communication mode, wherein the unicast communication mode is selected when the count is below a first predefined threshold and the unicast communication mode is switched from the unicast communication mode to one of the broadcast communication mode and the multicast communication mode when the count exceeds the first predefined threshold;

determining whether the decremented count is less than a second predefined threshold where the second predefined threshold is less than the first predefined threshhold;

if the decremented count is less than the second predefined threshold, assigning the all of the wireless devices totaling the decremented count of wireless devices, including the at least one wireless device, to receive the wireless communication of the information using the wireless information unicast communication mode; and wirelessly notifying the at least one wireless communication device to set its current wireless communication mode to the selected mode of wireless communication to receive the wireless communication of the information.

2. The method of claim 1, further comprising wirelessly notifying at least one wireless network controller to set its current wireless communication mode to the selected mode of wireless communication for wirelessly communicating the information.

3. The method of claim 1, further comprising:
notifying the wireless communication devices to receive the wireless communication of the information using the wireless information unicast communication mode.

4. The method of claim 1, further comprising:
notifying the wireless communication devices to receive the wireless communication of the information using at least one of the wireless information broadcast communication mode and the wireless information multicast communication mode.

5. A wireless communication system for selecting at least one of a wireless information broadcast communication mode, a wireless information multicast communication mode, and a wireless information unicast communication mode, for wireless communication of information to at least one wireless communication device, comprising:

a receiver for receiving at least one request for wireless communication of information to at least one wireless communication device;

a wireless communication mode selector, communicatively coupled with the receiver, for dynamically selecting a mode of wireless communication of information to the at least one wireless communication device, the mode of wireless communication being selected from at least one of:
a wireless information broadcast communication mode,
a wireless information multicast communication mode, and
a wireless information unicast communication mode,
wherein the wireless communication mode selector increments a count of wireless communication devices upon receipt of a request by at least one wireless communication device for wireless communication of information and the wireless communication mode selector selects the unicast communication mode when the count is less than a first predefined threshold and switches the mode of communication from the unicast mode to one of the broadcast communication mode and the multicast communication mode when count exceeds the first predefined threshold and wherein the wireless communication mode selector decrements the count of wireless communication devices request to deregister from receiving wireless communication of information or times out, determines whether the decremented count is less than a second predefined threshold that is less than the first predefined threshold and if the decremented count is determined to less then the second predefined threshold, the wireless communication mode selected selects a wireless information unicast communication mode for wireless communication of the information to all of the second total number of wireless communication devices; and a notifier, communicatively coupled with the wireless communication mode selector, for wirelessly notifying the at least one wireless communication device to set its current wireless communication mode to the selected mode of wireless communication to receive the wireless communication of the information.

6. The wireless communication system of claim 5, wherein the notifier notifies at least one wireless network controller to set its current wireless communication mode to the selected mode of wireless communication for wirelessly communicating the information.

* * * * *